US007303812B2

(12) United States Patent
Hashimoto et al.

(10) Patent No.: US 7,303,812 B2
(45) Date of Patent: Dec. 4, 2007

(54) HEAT-SHRINKABLE POLYESTER FILMS

(75) Inventors: Masatoshi Hashimoto, Inuyama (JP); Norimi Tabota, Inuyama (JP); Hiroshi Nagano, Iwakura (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 10/366,697

(22) Filed: Feb. 14, 2003

(65) Prior Publication Data

US 2003/0165671 A1 Sep. 4, 2003

(30) Foreign Application Priority Data

Feb. 14, 2002 (JP) ............................. 2002-037314
Apr. 17, 2002 (JP) ............................. 2002-115249
Sep. 26, 2002 (JP) ............................. 2002-280868

(51) Int. Cl.
*B32B 3/26* (2006.01)

(52) U.S. Cl. ............................. 428/318.6; 428/319.3; 428/319.7; 428/317.9; 428/480; 428/36.5; 428/36.91; 428/913

(58) Field of Classification Search ............ 428/317.9, 428/304.4, 480, 913, 319.3, 319.7, 318.6, 428/36.5, 36.91
See application file for complete search history.

(56) References Cited

U.S. PATENT DOCUMENTS

| 5,422,175 | A | * | 6/1995 | Ito et al. ................... 428/304.4 |
| 5,565,545 | A | | 10/1996 | Kriesche | |
| 5,925,208 | A | * | 7/1999 | Dronzek, Jr. ................ 156/257 |
| 6,231,955 | B1 | * | 5/2001 | Endo ........................... 428/215 |
| 6,231,958 | B1 | * | 5/2001 | Kim et al. ................... 528/272 |
| 6,458,437 | B1 | * | 10/2002 | Ito et al. ..................... 428/35.1 |
| 6,720,085 | B2 | * | 4/2004 | Ito et al. ...................... 428/480 |

FOREIGN PATENT DOCUMENTS

| EP | 1 024 162 A2 | 8/2000 |
| EP | 1 264 680 A1 | 12/2002 |
| JP | 1-258935 | 10/1989 |
| JP | 7-32478 | 2/1995 |
| JP | 7-53756 | 2/1995 |
| JP | 7-132581 | 5/1995 |
| JP | 8-58047 | 3/1996 |
| JP | 11-35718 | 2/1999 |
| JP | 11-48431 | 2/1999 |
| JP | 11-188817 | 7/1999 |
| JP | 2000-169602 | 6/2000 |
| JP | 2000-190440 | 7/2000 |
| JP | 2001-96616 | 4/2001 |
| JP | 2001-151908 | 6/2001 |
| JP | 2001-294681 | 10/2001 |
| JP | 2001-323082 | 11/2001 |
| JP | 2002-67210 | 3/2002 |
| JP | 2002-194114 | 7/2002 |
| JP | 2003-34729 | 2/2003 |
| JP | 2003-71927 | 3/2003 |

OTHER PUBLICATIONS

Translation of JP 05-111960, Katsuro et al, "Heat-shrinkable Polyester Film," May 7, 1993.*
English translation of JP 2000-169601, Tahoda et al, "Thermoshrinkable Polyester-Based Film," Jun. 20, 2000.*
EP Search Report (partial)—EP 03 00 3038.
Notice of Reason for Refusal dated Nov. 16, 2006, directed to counterpart JP application No. 2002-037314 (6 pages).
Notice of Reasons for Refusal dated May 31, 2007, directed to counterpart JP application No. 2002-115249 (6 pages).

* cited by examiner

*Primary Examiner*—Hai Vo
(74) *Attorney, Agent, or Firm*—Morrison & Foerster LLP.

(57) ABSTRACT

An object of the present invention is to provide a heat-shrinkable polyester film having a good light blocking property even when the label is not auxiliary processed by printing.

The present invention provides a heat-shrinkable polyester film mainly made of a polyester resin, wherein the film has a total luminous transmittance of not more than 40%, a haze of not less than 90%, a sample film has a heat shrinkage percentage of not less than 50% in the maximum shrinkage direction and a heat shrinkage percentage of not more than 10% in a direction orthogonal to the maximum shrinkage direction, the sample film being in a size of 10 cm×10 cm cut off from the film and obtained by immerse in hot water at 95° C. for 10 seconds, subsequently in water at 25° C. for 10 seconds, and withdrawing.

10 Claims, No Drawings

HEAT-SHRINKABLE POLYESTER FILMS

BACKGROUND OF THE INVENTION

1. Field of the Invention

The present invention relates to a heat-shrinkable polyester film, and in particular to a heat-shrinkable polyester film that provides a shrink-wrapping display label for containers such as beverage or other bottles (i.e., tubular label, the same applies hereinafter) having an excellent heat shrinkage property and an excellent light blocking property even when the label is not auxiliary processed by printing.

2. Description of the Related Art

Recently, the use of shrinkable labels for the purpose of protecting the contents in bottles from ultraviolet ray has been expanding. Hitherto, polyvinyl chloride shrinkable films capable of blocking UV light have been commonly used for the purpose, but there exists an increasing need for a new heat shrinkable film made of other materials that blocks UV light. Specific light blocking properties required for the film may vary depending on the content in the bottle the film covers, but blockage of UV light in a longer wavelength range of 360 to 400 nm, especially of 380 to 400 nm is regarded as more important for protection of the content such as beverage and food, since the UV ray in the range brings about deterioration and discoloration thereof.

As such labels, heat-shrinkable films made of polyvinyl chloride, polystyrene, etc., have been commonly used (Japanese Unexamined Patent Publication No. 11-188817, etc.), but due to the problems such as emission of harmful chlorinated gases during combustion of wastes with regard to polyvinyl chloride, and a low printability of the labels with regard to polystyrene films, heat-shrinkable polyester films have recently attracting more attention as a new material for the purpose. However, there has been no practical film among the many conventional heat-shrinkable polyester films that could effectively block UV light in the longer wavelength range described above.

Additionally, colored PET (polyethylene terephthalate) bottles containing dyes and pigments have occasionally been used for protection of the contents in bottles. But these colored bottles are not suited for recycling, because the entire resins collected in the recycling process become contaminated with dyes and pigments contained in the colored bottles, and thus an alternative method has been searched for. To produce the same advantageous effect as that of using colored bottles, a combined use of a colorless bottle and a colored heat-shrinkable label covering the same bottle has been investigated as a possible alternative method.

When a heat-shrinkable film is used as a colored label for covering bottles, displays including words and designs are usually printed on an inner surface of the label, and the surface is then further covered with white paint with the intention of providing a UV light blocking layer, but the thickness of the white ink-painted layer is typically about 3 μm, and not sufficient for that purpose. Although an attempt to print the entire surface of the film twice with white ink was made, such dual printed films too had drawbacks in quality (such as a change in the heat shrinkage property due to a larger thickness of the painted layer), leading to complexity in the label converting process, and thus elongation of the processing period and delay in delivery time.

SUMMARY OF THE INVENTION

An object of the present invention is to provide a heat-shrinkable polyester film that can solve the problems associated with the conventional heat-shrinkable polyester films, and that provides a shrink-wrapping display label for covering bottles having an excellent heat shrinkage property and an excellent light blocking property even when the label is not auxiliary processed by printing.

After intensive studies to solve the problems above associated with the prior art, the present inventors have found that the object could be attained by bringing a total luminous transmittance and a haze of a heat-shrinkable polyester film respectively into specific ranges, and thus completed the present invention.

A heat-shrinkable polyester film of the present invention is a film mainly made of a polyester resin, wherein the film has a total luminous transmittance of not more than 40%, a haze of not less than 90%, a sample film has a heat shrinkage percentage of not less than 50% in the maximum shrinkage direction and a heat shrinkage percentage of not more than 10% in a direction orthogonal to the maximum shrinkage direction, the sample film being in a size of 10 cm×10 cm cut off from the film and obtained by immerse in hot water at 95° C. for 10 seconds, subsequently in water at 25° C. for 10 seconds, and withdrawing.

Here, the heat shrinkage percentage in the maximum shrinkage direction means a heat shrinkage percentage in a direction where shrinkage of a sample is largest, and the maximum shrinkage direction is a direction having shortest side after shrinkage of the square sample cut off.

A heat-shrinkable polyester film of the present invention provides a shrink-wrapping display label for bottles having an excellent heat shrinkage property and an excellent light blocking property even when the label is not auxiliary processed by printing.

DETAILED DESCRIPTION OF THE PREFERRED EMBODIMENTS

Hereinafter, preferred embodiments of the heat-shrinkable polyester film of the present invention will be described.

A heat-shrinkable polyester film of the present invention has a total luminous transmittance of not more than 40%, a haze of not less than 90%, and a sample film has a heat shrinkage percentage of not less than 50% in the maximum shrinkage direction and a heat shrinkage percentage of not more than 10% in a direction orthogonal to the maximum shrinkage direction, the sample film being in a size of 10 cm×10 cm cut off from the film and obtained by immerse in hot water at 95° C. for 10 seconds, subsequently in water at 25° C. for 10 seconds, and withdrawing.

The heat shrinkage percentage (%) is a value determined by immersing a 10 cm×10 cm sample in hot water at a prescribed temperature (95° C. or 80° C.)±0.5° C. for 10 seconds under no load to induce heat shrinkage, immersing immediately in water at 25° C.±0.5° C. for 10 seconds, measuring length of the sample in the maximum shrinkage direction and in the direction orthogonal to the maximum shrinkage direction, and by calculating according to the following equation.

Heat shrinkage percentage (%)=100×(Length before shrinkage−Length after shrinkage)/(Length before shrinkage)

The heat-shrinkable polyester film of the present invention is made mainly of a polyester resin, more precisely, of a polyester resin or a polyester resin containing inactive fine particles and a non-miscible resin. Suitable polyester resins are, for example, polyesters having constitutional units consisting of an aromatic dicarboxylic acid and a glycol, or polyester compositions comprising a polyester resin and a polyester elastomer. The polyester compositions comprising a polyester resin and a polyester elastomer are more preferable. In such a polyester composition, the contents of the polyester and the polyester elastomer are, favorably, about 50 to 99 weight %, especially about 70 to 97 weight %, and about 1 to 50 weight %, preferably about 3 to 30 weight %, respectively.

Examples of the aromatic dicarboxylic acid used for production of the polyester above include terephthalic acid, isophthalic acid, naphthalene-1,4-dicarboxylic acid, naphthalene-2,6-dicarboxylic acid, 5-sodium sulfo-isophthalate, etc. Examples of the aliphatic dicarboxylic acid include dimer acid, glutaric acid, adipic acid, sebacic acid, azelaic acid, oxalic acid, succinic acid, etc. Hydroxycarboxylic acids such as p-hydroxybenzoic acid, and polyvalent carboxylic acids such as trimellitic anhydride pyromellitic anhydride may also be used at the same time if desired.

Examples of the glycol for production the polyester above include alkylene glycols such as ethylene glycol, diethylene glycol, dimer diol, propylene glycol, triethylene glycol, 1,4-butanediol, neopentylglycol, 1,4-cyclohexanedimethanol, 1,6-hexanediol, 3-methyl-1,5-pentanediol, 2-methyl-1,5-pentanediol, 2,2-diethyl-1,3-propanediol, 1,9-nonanediol, 1,10-decanediol, etc. Alkylene oxide adducts of bisphenol compounds or the derivatives thereof, trimethyrolpropane, glycerol, pentaerythritol, etc., may also be used together.

The polyester of the present invention may be a single polyester resin or a combination of two or more polyester resins. From the viewpoint of the heat shrinkage property, two or more polyesters having different glass transition temperatures (Tg) are preferably mixed and used as the polyester of the present invention. Simultaneous use of polyethylene terephthalate and a copolymeric polyester resin (or two or more copolymeric polyesters) is more preferable, but the simultaneous use of a mixture of two or more copolymeric polyesters is also possible. Alternatively, a combination of a polyester resin with polybutylene terephthalate, polycyclohexylene dimethylene terephthalate, polyethylene naphthalate, or the like, and a combination of one of these polyesters and another copolymeric polyester may also be used. Intrinsic viscosity of the polyester of the present invention is preferably 0.50 or higher, more preferably 0.60 or higher, and most preferably 0.65 or higher. When the intrinsic viscosity of a polyester resin is less than 0.50, the polyester has a tendency to crystallize during processing, and is thus unable to provide a heat-shrinkable film with a sufficiently high shrinkage percentage.

The polyester can be produced by melt-polymerization according to any of common methods, including the so-called direct polymerization method, i.e., by polycondensation of oligomers obtained by a direct reaction of a dicarboxylic acid component and a glycol component, and the so-called ester-exchange polymerization method, i.e., by ester exchange reaction of a dicarboxylic acid dimethyester component and a glycol component and subsequent polycondensation. The polyester may be produced by other polymerization processes. Degree of polymerization of the polyester is preferably 0.3 to 1.3 dl/g as an intrinsic viscosity (IV).

To the polyester may be added polymerization catalysts such as antimony oxide, germanium oxide, titanium compounds, etc., and additionally, additives for prevention of disadvantages including coloring, gelation and the like, for example, Mg salts such as magnesium acetate, magnesium chloride, etc., Ca salts such as calcium acetate, calcium chloride, etc., Mn salts such as manganese acetate, manganese chloride, etc., Zn salts such as zinc chloride, zinc acetate, etc., and Co salts such as cobalt chloride, cobalt acetate, etc., respectively at concentrations of 300 ppm (mass ratio, same hereinafter) or less as metal ions with respect to the polyester, and phosphoric acid or phosphoric ester derivatives such as phosphoric trimethylester, phosphoric triethylester, etc., at concentrations of 200 ppm or less as phosphorus (P).

The polyester elastomer to be used in the present invention is a polyester block copolymer, for example, consisting of a high melting point crystalline polyester segment and a low melting point soft segment.

The high melting point crystalline polyester segment of the polyester block copolymer include preferably a polyester unit consisting mainly of ester bonds or of ester and ether bonds, that contains at least one group containing an aromatic nucleus as a main recurring unit and hydroxyl groups at the ends of molecule. Preferably, the high melting point crystalline polyester segment has a melting point of at least 200° C., and favorable examples thereof include ester units such as ethylene terephthalate, tetramethylene terephthalate, 1,4-cyclohexylene dimethylene terephthalate, ethylene-2,6-naphthalate; ester and ether units such as ethylene oxybenzoate, p-phenylene bis-oxyethoxyterephthalate; copolymeric ester units or copolymeric ester ether units containing tetramethylene terephthalate or ethylene terephthalate as a main constitutional unit, and tetramethylene isophthalate or ethylene isophthalate, tetramethylene adipate or ethylene adipate, tetramethylene sebacate or ethylene sebacate, 1,4-cyclohexylene dimethylene terephthalate, tetramethylene-p-oxybenzoate or ethylene-p-oxybenzoate or the like as another copolymerization unit; and the like. If a copolymeric ester or a copolymeric ester ether unit is employed as the high melting point crystalline polyester segment, the copolymeric unit has preferably the tetramethylene terephthalate or ethylene terephthalate unit in an amount of 60 mole % or more.

Alternatively, the low melting point soft polymer segment of the polyester block copolymer is preferably a polymer having a melting point of 80° C. or less, and a molecular weight of 400 or more, preferably 400 to 8000. Favorable examples thereof include polyether glycols and polylactones. Typical examples of the polyether glycol include poly(oxytetramethylene) glycol; poly(oxyethylene) glycol; poly(oxy-1,2-propylene) glycol; and a mixture of two or more of these polymers may also be used. Typical examples of the polylactone include, polycaprolactone, polyenantolactone, polycaprylolactone and the like, and a mixture of two or more of these polymer segments may also be used. A polyester elastomer having a polylactone such as poly-ε-caprolactone and the like as the low melting point soft polymer segment is particularly preferred.

The copolymerization ratio of the high melting point crystalline polyester segment to the low melting point soft polymer segment is variable and decided suitably according to the requirements both of the polyester elastomer and the resulting film. In general, increase in the content of the high melting point crystalline polyester segment results in increase in hardness and mechanical properties of the resulting polyester elastomer. Alternatively, increase in the content of the low melting point soft polymer segment results in increase in softness and flexibility of the resulting polyester elastomer and thus in low-temperature properties of the resulting film. Accordingly, the copolymerization ratio may be decided by taking into account the balance between these mechanical and low-temperature properties. Typically, the copolymerization ratio of the high melting point crystalline polyester segment to the low melting point soft polymer segment is in the range of 97/3 to 5/95, more commonly, of about 95/5 to 30/70.

In order to provide a film with a light blocking property, i.e., suppression of a total luminous transmittance to not more than 40% and intensification of a haze to not less than 90%, the polyester resin, the main constituent, preferably contains inactive fine particles such as both inorganic or organic fine particles in an amount of 0.1 to 20 weight %, more preferably of 0.5 to 10 weight % with respect to the film weight. The content of the inactive fine particles is preferably at least 0.1 weight % in order to provide an anticipated light blocking property, while when the content exceeds 20 weight %, the polyester resin leads to a film weaker in mechanical strength and tends to give rise to problems in the film-casting process.

In the case where inactive fine particles are added to the polyester resin for production of the heat-shrinkable polyester film, the inactive fine particles may be added before polyester polymerization, but usually are added after polyester polymerization. Examples of the inactive fine particles include inactive inorganic fine particles known in the art such as kaolin, clay, calcium carbonate, silicon oxide, aluminum oxide, titanium oxide, calcium phosphate, carbon black; high-melting-point organic fine particles not meltable and insoluble to melt of the polyester resin during melt-casting; crosslinked polymeric fine particles; calcium terephthalate, metal compound catalysts used for production of the polyester; and particles in the resin formed by, for example, an alkali metal or alkali-earth metal compound during ester polymerization.

Average diameter of the inactive fine particles suitable to be introduced into the polyester resin is usually in the range of 0.001 to 3.5 μm. The average diameter of the inactive fine particles is determined by the Coulter Counter method.

The heat-shrinkable film of the present invention preferably contains a large number of minute voids therein to show a desired light opacity and a haze. Such a void-containing film may be prepared, for example, by mixing a polyester resin with a foaming agent and coextruding the resulting mixture. But it is more favorable that the voids are generated by uniaxial or biaxial drawing of a film cast from a resin containing both a polyester resin and a thermoplastic resin not miscible therewith.

The non-miscible resins suitable to be contained in a polyester resin are not particularly limited so long as they are not miscible with the polyester resin, but preferably thermoplastic resins not miscible therewith, and specific examples of the thermoplastic resin include polystyrene resins, polyolefin resins, polyacrylic resins, polycarbonate resins, polysulfone resins, and cellulosic resins. Especially, polystyrene resins, and polyolefin resins such as polymethylpentene and polypropylene, have an excellent void-forming property, and thus are preferable to provide a film with a total luminous transmittance of not more than 40%, as well as a haze of not less than 90%.

Polystyrene resins used as the non-miscible resin are thermoplastic resins containing a polystyrene structure as a basic structural unit, and specific examples thereof include homopolymers such as atactic polystyrenes, syndiotactic polystyrenes, and isotactic polystyrenes; modified resins thereof modified with other components by graft or block copolymerization such as high impact polystyrene resins and modified polyphenylene ether resins; and mixtures of these polystyrene resins and thermoplastic resins miscible therewith such as mixtures of polystyrene and polyphenylene ether.

Chips of a polyester resin and a non-miscible resin may be mixed in an extruder and directly extruded in a molten state therefrom, or mixed and kneaded in an kneader and then melt-extruded from an extruder. Alternatively, chips of a polyester resin having a polystyrene resin completely uniformly dispersed therein, produced by adding and mixing a polystyrene resin in polyester precursors in the polyester polymerization process, may be melt-extruded.

The heat-shrinkable polyester film of the present invention is a single- or multi-layered film mainly made of a polyester resin, and preferably is multi-layered film having at least one void-containing layer made of a polyester resin containing inactive fine particles and a non-miscible resin.

More specifically, the heat-shrinkable polyester film of the present invention may be a single-layered void-containing film that contains numerous voids, or alternatively a multi-layered film comprising of a void-containing film that contains numerous voids and at least one film containing no or a smaller number of voids on the surface thereof. Such a multi-layered film may be prepared by the steps of supplying two different resins, respectively to different extruders and melting these resins therein; overlaying the molten resins before or inside a T-die; solidifying the molten film cast from the T die on cooling rolls; and drawing the resulting film at least in one direction. For the film layer containing no or a smaller number of voids, a resin containing no or a smaller amount of the non-miscible resin than that for the void-containing layer is preferably used. In this way, the resulting film, having no or a smaller number of voids that bring about irregularity into film, has a surface much smoother. By placing such a smoother layer having no or a smaller number of voids on the surface of a void-containing layer, it becomes possible to provide a composite void-containing film with an excellent printability and a sharp contrast and a vividness of the printed articles. Additionally, the composite film, having a relatively low void content as a whole, retains most of rigidity of a film that contains no voids, and labels prepared therefrom become much easier to handle in operation of shrink wrapping of bottles.

The heat-shrinkable polyester film of the present invention is more preferably a film having a trilayered structure consisting of an internal void-containing layer containing numerous voids, and two film layers sandwiching the internal layer containing no or a small number of voids. The thermoplastic resins to be contained in the polyester resin are not particularly limited so long as they are not miscible therewith. Addition of these void-forming thermoplastic resins (non-miscible resins with a polyester) often results in emission of fumes in the melt-extrusion process and thus reduction in the production efficiency due to the fumes and the pollution. A film of a trilayered structure having a void-containing layer, the surfaces thereof being covered by two layers containing a smaller amount of the thermoplastic resin (containing no or smaller number of voids), eliminates the problem of fumes generated by direct contact of the void-containing layer with die lips in the melt-extrusion process, and enables a longer stable production of the desired heat-shrinkable film. The trilayered film having the void-containing layer inside is especially recommended when a polystyrene resin that often leads to the problems of fuming is used in the void-forming thermoplastic resin.

The film of the present invention may also contain additives such as stabilizers, coloring agents, antioxidants, and antistatic agents.

The heat-shrinkable polyester film of the present invention should have a total luminous transmittance, as determined according to JIS-K-7136, of not more than 40%. When the total luminous transmittance is over 40%, the film is not favorable anymore, as the film is, when a container is shrink wrapped therewith, not opaque enough to conceal the content in the container, or to block UV light, resulting in deterioration of the content. The total luminous transmittance is further more favorably not more than 30%.

The polyester film of the present invention should have a haze, as determined according to JIS K 7136, of not less than 90%. A film with a haze of less than 90% is not favorable, as the film is, when a container is shrink-wrapped therewith, opaque enough neither to conceal the content in the container nor to block light, resulting in deterioration of the content. The haze is more preferably not less than 95%.

Heat shrinkage percentage of the film of the present invention in the maximum shrinkage direction in hot water at 95° C. for 10 seconds is not less than 50%, and preferably 50 to 80%. With a heat shrinkage percentage of less than 50%, the label does not shrink sufficiently. On the other hand, with a heat shrinkage percentage of more than 80%, the label, having an excessively high shrinkage percentage, sometimes displaces upward when heated in shrinkage tunnel.

Heat shrinkage percentage of the film of the present invention in the direction orthogonal to the maximum shrinkage direction is not more than 10%, and preferably 0% to 10%. With a heat shrinkage percentage of less than 0%, i.e., of a negative value, the film rather expands, leading to horizontal crinkling (i.e., in the maximum shrinkage direction) of the label generated during the shrink-wrapping operation persist, while with a heat shrinkage percentage of more than 10%, vertical shrinkage (in the direction orthogonal to maximum shrinkage direction) of the label becomes greater, causing an economical problem due to requirement of an wider film for production of a shrank label with a certain width. Thus the films having a heat shrinkage percentage outside the range above are unfavorable.

The film of the present invention has a maximum value in shrinkage stress at 90° C. of not less than 15 MPa, preferably, 11 to 15 MPa in the maximum shrinkage direction.

With the maximum value in shrinkage stress of over 15 MPa, the label has such a great shrinkage potential that the articles printed thereon in direct contact with a container tends to become distorted, while with the maximum value of less than 11 MPa, the label sometimes shrinks sufficiently where the bottle to be wrapped with the label is narrowed or necked.

Here, the maximum value of the heat shrinkage stress is determined specifically as follows.
(1) A sample with a length of 200 mm in the maximum shrinkage direction and a width of 20 mm is prepared.
(2) A hot-air oven in a tensile tester mounted with a hot-air oven (e.g., Tensiron manufactured by Toyoseiki) is heated to 90° C.
(3) Hot air supply is terminated and the sample is placed in the heating oven. Distances between the corresponding chucks are 100 mm (constant).
(4) After the door of the heating oven was immediately closed and the supply of hot-air (90° C., at a rate of 5 m/s) was resumed, the heat shrinkage stress is measured.
(5) The maximum value obtained from the resulting chart of the heat shrinkage stress is regarded as the maximum value of the heat shrinkage stress (MPa).

The film of the present invention preferably has a heat shrinkage percentage of not less than 65% in the maximum shrinkage direction after treatment in hot water 80° C., and more preferably of 65 to 95%. When the film of the present invention is converted to a label for packaging bottles, the maximum shrinkage direction at 80° C. of the film is usually made parallel to the direction of the edge of the resulting tubular label. A tubular label with a heat shrinkage percentage of less than 65% in the maximum shrinkage direction often causes problems of insufficient shrinkage at narrowed or necked portions of the container such as a PET bottle. Alternatively, with a heat shrinkage percentage in the maximum shrinkage direction of more than 95%, the label shrinks to a greater extent and sometimes displaces upward when the tubular container wrapped with the label is conveyed and heated in a shrinkage tunnel, and thus it becomes necessary to control cautiously the operational conditions of the shrink wrapping process.

Alternatively, heat shrinkage percentage of the film in the direction perpendicular to the maximum shrinkage direction after treatment in hot water 80° C. is not more than 2%, preferably 0 to 2%, and more preferably 0 to 1%. With a heat shrinkage percentage of less than 0% (negative shrinkage percentage) in the direction orthogonal to that of the edge of the tubular label, namely, the width direction of the tubular label, the film inevitably expands. The allowable lower limit of the hot water shrinkage percentage is about −2%, and with a label having the value more negative, horizontal (maximum shrinkage direction) crinkles thereof generated during shrink wrapping tends to persist. Conversely, the heat shrinkage percentage in the direction orthogonal to the maximum shrinkage direction is over 2%, vertical shrinkage (in the direction orthogonal to maximum shrinkage direction) of the label becomes larger, causing an economical problem due to requirement of an wider film for production of a shrank label with a certain width.

The film of the present invention has, after storage under an atmosphere of 30° C. and 85% relative humidity for 28 days, a film elongation at break of not less than 5%, preferably not less than 10%, in the direction orthogonal to the maximum shrinkage direction as determined. With a film elongation at break of less than 5%, the film breaks down by the tension applied in the printing process, leading to a reduction in productivity, and thus not desirable. The film elongation at break of the heat-shrinkable polyester film immediately after production in the direction orthogonal to the maximum shrinkage direction is also not less than 5%.

Glass transition temperature (Tg) of the heat-shrinkable polyester film of the present invention is in the range of about 50 to 90° C., preferably 55 to 85° C., and more preferably 55 to 80° C. A film with the glass transition temperature (Tg) within the range above has an sufficiently high shrinkage at a low temperature and does not show an exceedingly high spontaneous shrinkage, and thus provides the shrank labels with a good finish.

Preferably, the film of the present invention has a favorable solvent adhesion property by the use of organic solvents including aromatic hydrocarbons such as benzene, toluene, xylene, and trimethylbenzene, halogenated hydrocarbons such as methylene chloride and chloroform, phenols such as phenol, furans such as tetrahydrofuran, oxolanes such as 1,3-dioxolane, and the like. Typically, the solvent adhesion property by the use of the non-halogenated organic solvent can be shown by peeling strength of a film sample adhered with 1,3-dioxolane at the both ends thereof overlapped. The use of 1,3-dioxolane is favorable also from the viewpoint of safety. The solvent adhesion strength of a film adhered at the both ends thereof overlapped is preferably 4 N/15 mm or more. With a solvent adhesion strength of less than 4 N/15 mm, the label often peel off when the label is used for shrink-wrapping of a container, and is not favorable. Alternatively with a solvent adhesion strength of not less than 4 N/15 mm, the label has sufficiently high resistance to peeling. Here, the solvent adhesion strength is measured by the method described in a later part in Example section.

For further increasing the solvent adhesion property of the film of the present invention, it is effective, for example, to copolymerize a polyester resin by use of a component that reduces the glass transition temperature (Tg) of the polyester resin as a comonomer.

To meet all the requirements in properties above, the heat-shrinkable polyester film of the present invention may be a single-layered film consisting only of a void-containing layer, but is preferably a multi-layered film, preferably having a layered structure consisting of a void-containing layer (hereinafter, occasionally referred to as B layer) having numerous voids therein and at least one film containing no or a smaller number of voids laminated on the surface thereof (hereinafter, occasionally referred to as A layer), i.e., a multi-layered film having A/B or A/B/A structure. When the film of the present invention is a bilayered film having A/B structure, the thickness ratio of A layer and B layer (A/B) is preferably in the range of 50/50 to 20/80. With a thickness ratio of B layer of less than 50%, the label is short of the light blocking property, revealing the content in a container wrapped thereby, or causing deterioration of the content due to insufficient blocking of UV light, and thus undesirable. Alternatively, when the film has a three-layered structure of A/B/A, the thickness ratio of A layer to B layer (A/B/A) is preferably in the range of 25/50/25 to 10/80/10. With a thickness ratio of B layer of less than 50%, the film is short of the light blocking property, revealing the content in a container wrapped thereby, or causing deterioration of the content due to insufficient blocking of UV light, and thus undesirable.

Hereinafter, a typical process of producing a film of the present invention will be described. The polyester resin to be used for production of the heat-shrinkable polyester film of the present invention may be a single resin or a mixture of two or more resins, but it is desirable to mix two or more polyester resins different in glass transition temperature (Tg) to obtain a film having an excellent heat shrinkage property. The polyester resin containing inactive fine particles and a non-miscible resin, more preferably a mixture of two or more polyester resins different in glass transition temperature (Tg) containing inactive fine particles and a non-miscible resin is dried in an ordinary drier such as a hopper drier, a paddle drier, or in a vacuum drier, and subsequently extruded in a molten state at a temperature of 200 to 320° C. Any conventional methods known in the art such as the T die and tubular methods, may be used for the melt-extrusion of the resin into an undrawn film, which may be either a single-layered film, or a two- or three-layered film prepared by co-extrusion of two or three resins having same or different components.

After the melt-extrusion, the cast film is rapidly chilled to yield an undrawn film. If the T die method is employed, the use of the so-called electrostatic field condensation method during rapid chilling of the film enables the production of a film scarce in thickness shading. The "undrawn film", meanwhile, contains the film where a tension is applied for conveying the film.

The undrawn film thus obtained is then drawn uniaxially or biaxially to produce a film that meets the constituent features of the invention. The film may be drawn uniaxially in the machine direction by the roll method or in the traverse direction by the tenter method. Alternatively, the film may be drawn biaxially by the method known in the art, extensively either in the machine or traverse direction and to a very limited extent in another direction. The film may further be redrawn.

The film is preferably drawn in the machine or traverse direction at least 2.0 times, preferably at least 2.5 times, and additionally in another direction, and the resulting drawn film is further heat-treated to give the film of the present invention.

The heat treatment of the film is usually conducted under tension, but may also be done under relaxation or expansion of not more than 20%. The heat treatment can be carried out in accordance with the conventional methods known in the art such as those by heating a film by direct contact to heating rolls and by heating a film, both ends thereof gripped by clips, in the tenter.

Before, during or after the drawing process, one or both surfaces of the film may be treated with corona discharge, to increase printability of the printing surface of the film and/or solvent adhesion property of the adhesive surface.

Further, before, during or after the drawing process above, either one or both surfaces may be coated, to improve adhesive, surface lubricant, antistatic, sliding, and light blocking properties of the film.

In this way, a single-layered film consisting only of void-containing film or a multi-layered film containing at least one void-containing layer that meets the requirements of the present invention, i.e., heat shrinkage percentage of not less than 65% in the maximum shrinkage direction after treatment in hot water 80° C., and heat shrinkage percentage of not more than 2% in the direction orthogonal thereto after treatment in hot water 80° C. can be prepared without difficulty. In particular, a multi-layered film that meets the requirements of the present invention in heat shrinkage property above having at least one layer containing inactive fine particles and a non-miscible resin as a constituent unit can be prepared quite easily.

When the heat-shrinkable polyester film of the present invention is used as a single-layered film consisting only of a void-containing film, or a multi-layered film containing at least one void-containing layer, a film having the heat shrinkage percentage of not more than 2% in the direction orthogonal to the maximum shrinkage direction can be easily obtained. The reason is not obvious, but it is likely that the void-containing layer plays a role as a shock absorber and suppresses shrinkage in the direction orthogonal to the maximum shrinkage direction even though such a phenomenon is not observed in the maximum shrinkage direction where the shrinkage stress is much greater.

Thickness of the heat-shrinkable polyester film of the present invention is not particularly limited, but is preferably in the range of 10 to 200 μm, more preferably 20 to 100 μm, as a heat-shrinkable film for labels.

The heat-shrinkable polyester films of the present invention provides a heat-shrinkable label having an excellent shrinkage property, no deformation at the edge thereof when the label is used for shrink-wrapping of a container such as bottles, and an excellent light blocking property even when the label is not auxiliary processed by printing.

EXAMPLE

Hereinafter, the present invention will be described in more detail with reference to EXAMPLES, but it should be understood that the present invention is not restricted to these EXAMPLES.

(1) Total Luminous Transmittance

Transmittance of light of a film was determined according to JIS-K-7136 by using a spectrometer, "NDH-2000T" manufactured by Nippon Denshoku Kogyo.

(2) Heat Shrinkage Percentage

A film was cut along the main shrinkage direction and the direction perpendicular thereto to give a 10 cm×10 cm square sample. The sample was immersed in hot water at 80° C.±0.5° C. or 95° C.±0.5° C. for 10 seconds under no load inducing heat shrinkage, and immediately thereafter in water at 25° C.±0.5° C. for 10 seconds. Subsequently, length of the sample in the lengthwise (the main shrinkage direction) or the traverse (perpendicular thereto) directions was determined and the heat shrinkage percentage was calculated according to the following equation.

Heat shrinkage percentage (%)=100×{(Length before shrinkage−Length after shrinkage)/Length before shrinkage}

A direction having a largest shrinkage percentage is the maximum shrinkage direction, and a heat shrinkage percentage in the maximum shrinkage direction is defined as the heat shrinkage percentage in the maximum shrinkage direction after treatment in hot water 80° C. or 95° C.

(3) Film Elongation at Break

A rectangular film sample having a width of 15 mm in the direction perpendicular to the maximum shrinkage direction was placed in a tensile tester ("STM-T-50BP" manufactured by Toyo Baldwin), distance between chucks being previously adjusted to 50 mm. Film elongation at break was determined at a stretching rate of 200 mm/min.

(4) Label Shrinkage Property

A quadrangular prism PET bottle (210 mm in height, 60 mm in diameter of the bottom thereof, manufactured by Yoshino Kogyo, a bottle used for a green tea beverage of Suntory) was shrink-wrapped with a heat-shrinkable film label and the resultant label-wrapped PET bottle was conveyed through a steam tunnel (Type: SH-1500-L, manufactured by Fuji Astec Inc.) in a condition of a staying time therein of 2.5 seconds and a zone temperature of 80° C. (the number of samples=20).

The label shrinkage property of the labels was determined by visual examination and classified according to the following criteria.

○: absence of either crinkling, upward displacement, or insufficient shrinkage

X: presence of crinkling, upward displacement, or insufficient shrinkage (5) Solvent Adhesion Property A film sample was slit into a narrow film with a width of 230 mm, which was then bonded with 1,3-dioxolane at both ends thereof overlapped in a center seal machine into a tubular film, which was further flattened and rewound. Subsequently, the tubular film was slit in the direction orthogonal to the adhesion direction to give a tubular label sample. The tubular label sample was cut open to give a film sample having the adhesion portion at the center thereof. From this film sample, test piece with a 100 mm length and a 15 mm width was cut off, and a film test piece was placed in a tensile tester (Tensiron "UTL-4L", manufactured by Toyoseiki), distance between the chucks being previously adjusted to 50 mm, so that the solvent adhesion portion is placed at the center between the corresponding chucks. The tensile test was conducted at a condition of a temperature of 23° C. and a tension test rate of 200 mm/min, and the peeling strength of the adhesion portion was determined and designated as the solvent adhesion strength.

If the determined value of the solvent adhesion strength is not less than 4 N/15 mm, the film sample was designated as ○, and if it is less than 4 N/15 mm, designated as X.

(6) Glass Transition Temperature (Tg)

Glass transition temperature was determined by using a DSC (Type: DSC220, manufactured by Seiko Instruments). A sample of an undrawn film with a weight of 10 mg was heated from −40° C. to 120° C. at a rate of 20° C./min, and Tg was determined from the endothermic pattern obtained. The glass transition temperature (Tg) was a temperature at an intersection of tangent lines of the DSC pattern before and after the endothermic curve.

(7) Maximum Value of the Heat Shrinkage Stress

A sample of lengths of 200 mm in the maximum shrinkage direction and 20 mm in the orthogonal direction was prepared. The sample was placed in an oven previously heated to 90° C. and the supply of hot-air therein previously being terminated, of a tensile tester mounted with an hot-air oven (Tensiron manufactured by Toyoseiki). Distances between the corresponding chucks were 100 mm (constant). After the door of the heating oven was immediately closed and the supply of hot-air (90° C., at the rate of 5 m/s) was resumed, the heat shrinkage stress was detected and measured. A maximum value obtained from the resulting chart of the heat shrinkage stress was regarded as the maximum value of the heat shrinkage stress (MPa).

The polyesters used in EXAMPLES and COMPARATIVE EXAMPLES were as follows.

Polyester a: Polyethylene terephthalate (IV: 0.75 dl/g)

Polyester b: Polyester obtaining of 100 mole % of terephthalic acid, 70 mole % of ethylene glycol, and 30 mole % of neopentyl glycol (IV: 0.72 dl/g)

Polyester c: Polyester elastomer consisting of 70 weight % of polybutylene terephthalate unit and 30 weight % of ε-caprolactone unit {reduced viscosity (η sp/c): 1.30 dl/g}

Polyester d: Polybutylene terephthalate (IV: 1.20 dl/g)

Example 1

A heat-shrinkable polyester film having a three-layered structure consisting of a void-containing layer (B layer) containing numerous voids therein and two film layers having no or only a small numbers of voids therein (A layers) sandwiching the void-containing layer was prepared.

As shown in TABLE 1, a polyester composition (a resin for A layer) consisting of 30 weight % of polyester a, 65 weight % of polyester b, and 5 weight % of polyester c, and another polyester composition (a resin for B layer) consisting of 10 weight % of polyester a, 65 weight % of polyester b, 5 weight % of polyester c, 10 weight % of crystalline polystyrene resin (G797N of Japan Polystyrene) and 10 weight % of titanium dioxide (TA-300 of Fuji Titanium Industry) were, respectively, supplied into and mixed and polymers were fed into and layered in a feed block, and melted in two separate extruders, and the resulting molten-cast from a T die at 280° C. into a three-layered film at such a casting rate that the resulting cast film would provide a drawn film having a thickness of A/B/A at 12.5/25/12.5 μm, and rapidly chilled by chill rolls, yielding an undrawned film. The undrawn film was then drawn 4.0 times at a film temperature of 70° C. in the traverse direction in a tenter, yielding a heat-shrinkable polyester film with a thickness of 50 μm.

Examples 2 to 6 and Comparative Example 1

In a similar manner to EXAMPLE 1 except that the content of polystyrene and titanium dioxide was changed, various heat-shrinkable polyester films having the composition shown in TABLE 1 with a thickness of 50 μm were prepared.

The results of evaluation of the film samples prepared in EXAMPLES 1 to 6 and COMPARATIVE EXAMPLE 1 were summarized in TABLE 1.

TABLE 1

| | | Resin Composition (weight %) | | | | | Drawing condition | | Total Luminous Transmission (%) | Haze (%) | Maximum Value of Shrinkage Stress (MPa) |
|---|---|---|---|---|---|---|---|---|---|---|---|
| | | | Polyester | | | Additives | | | | | |
| | Layer | a | b | c | Polystyrene | Titanium dioxide | Drawing Temperature (° C.) | Drawing Ratio (times) | | | |
| EXAMPLE 1 | A | 30 | 65 | 5 | 0 | 0 | 70 | 4.0 | 27 | 97 | 13 |
| | B | 10 | 65 | 5 | 10 | 10 | | | | | |
| | A | 30 | 65 | 5 | 0 | 0 | | | | | |
| EXAMPLE 2 | A | 30 | 65 | 5 | 0 | 0 | 70 | 4.0 | 20 | 98 | 12 |
| | B | 0 | 65 | 5 | 10 | 20 | | | | | |
| | A | 30 | 65 | 5 | 0 | 0 | | | | | |
| EXAMPLE 3 | A | 30 | 65 | 5 | 0 | 0 | 70 | 4.0 | 23 | 98 | 11 |
| | B | 5 | 65 | 5 | 15 | 10 | | | | | |
| | A | 30 | 65 | 5 | 0 | 0 | | | | | |
| EXAMPLE 4 | A | 10 | 65 | 5 | 10 | 10 | 70 | 4.0 | 17 | 99 | 13 |
| | B | 10 | 65 | 5 | 10 | 10 | | | | | |
| | A | 10 | 65 | 5 | 10 | 10 | | | | | |
| EXAMPLE 5 | A | 0 | 65 | 5 | 10 | 20 | 70 | 4.0 | 13 | 99 | 12 |
| | B | 0 | 65 | 5 | 10 | 20 | | | | | |
| | A | 0 | 65 | 5 | 10 | 20 | | | | | |
| EXAMPLE 6 | A | 5 | 65 | 5 | 15 | 10 | 70 | 4.0 | 16 | 99 | 11 |
| | B | 5 | 65 | 5 | 15 | 10 | | | | | |
| | A | 5 | 65 | 5 | 15 | 10 | | | | | |
| COMPARATIVE EXAMPLE 1 | A | 30 | 65 | 5 | 0 | 0 | 70 | 4.0 | 85 | 9 | 15 |
| | B | 30 | 65 | 5 | 0 | 0 | | | | | |
| | A | 30 | 65 | 5 | 0 | 0 | | | | | |

| | Layer | Solvent Adhesion Strength | Heat Shrinkage Percentage (%) | | | | Film elongation at break (%) | | Label Shrinkage Property |
|---|---|---|---|---|---|---|---|---|---|
| | | | (1) | (2) | (3) | (4) | Immediately after production | After 28 days | |
| EXAMPLE 1 | A | ○ | 1.0 | 73.0 | −0.4 | 68.4 | 500 or more | 100 or more | ○ |
| | B | | | | | | | | |
| | A | | | | | | | | |
| EXAMPLE 2 | A | ○ | 1.0 | 72.0 | 0 | 67.5 | 500 or more | 100 or more | ○ |
| | B | | | | | | | | |
| | A | | | | | | | | |
| EXAMPLE 3 | A | ○ | 0.5 | 71.0 | −1.0 | 66.6 | 500 or more | 100 or more | ○ |
| | B | | | | | | | | |
| | A | | | | | | | | |
| EXAMPLE 4 | A | X | 1.0 | 73.0 | −0.5 | 68.0 | 500 or more | 100 or more | ○ |
| | B | | | | | | | | |
| | A | | | | | | | | |
| EXAMPLE 5 | A | X | 1.0 | 72.0 | 0.1 | 67.1 | 500 or more | 100 or more | ○ |
| | B | | | | | | | | |
| | A | | | | | | | | |
| EXAMPLE 6 | A | X | 0.5 | 71.0 | −0.9 | 65.9 | 500 or more | 100 or more | ○ |
| | B | | | | | | | | |
| | A | | | | | | | | |

TABLE 1-continued

| | | | | | | | | | | |
|---|---|---|---|---|---|---|---|---|---|---|
| COMPARATIVE EXAMPLE 1 | A B A | ○ | 0.5 | 74.0 | −1.0 | 69.1 | 500 or more | 4 | ○ |

(1) in direction perpendicular to maximum shrinkage direction in hot water at 95° C.
(2) in maximum shrinkage direction in hot water at 95° C.
(3) in direction perpendicular to maximum shrinkage direction in hot water at 80° C.
(4) in maximum shrinkage direction in hot water at 80° C.

As is obvious from TABLE 1, the heat-shrinkable polyesters prepared in EXAMPLES 1 to 6 had an excellent light-blocking property.

In contrast, the heat-shrinkable polyester film prepared in COMPARATIVE EXAMPLE 1 was inferior in the light blocking property. The heat-shrinkable polyester film prepared in COMPARATIVE EXAMPLE 1 was thus inferior both in film quality and practicality.

Example 7

As shown in TABLE 2, a polyester composition (as a resin for A layer) consisting of 30 weight % of polyester a, 67 weight % of polyester b, and 3 weight % of polyester c, and another polyester composition (as a resin for B layer) consisting of 10 weight % of polyester a, 65 weight % of polyester b, 5 weight % of polyester c, 10 weight % of a crystalline polystyrene resin (G797N of Japan Polystyrene) and 10 weight % of titanium dioxide (TA-300 of Fuji Titanium Industry) were, respectively, supplied into and mixed and melted in two separate extruders and the resulting molten-polymers were fed into and layered in a feed block, and cast from a T die at 280° C. into a three-layered film at such a feed rate that the resulting cast film would provide a drawn film having a thickness ratio of A/B/A at 10/20/10 μm, and rapidly chilled by chill rolls, yielding an drawn film. The undrawn film thus obtained was drawn 4.0 times at a film temperature 70° C. in the traverse direction in a tenter, yielding a heat-shrinkable polyester film with a thickness of 40 μm.

Examples 8 and 9, and Comparative Examples 2 and 3

In a similar manner to EXAMPLE 4, except that the content of polyester, polystyrene and titanium dioxide, and the drawing condition were changed, various heat-shrinkable polyester films having the composition shown in TABLE 2 with a thickness 40 μm were prepared.

The results of evaluation of the film samples prepared in EXAMPLES 7 to 9, and COMPARATIVE EXAMPLES 2 and 3 were summarized in TABLE 2.

TABLE 2

| | | Resin composition (weight %) | | | | | | Drawing condition | | Total | | | |
|---|---|---|---|---|---|---|---|---|---|---|---|---|---|
| | | Polyester | | | | Additives | | Drawing Temperature | Drawing Ratio | Luminous Transmission | Haze | Maximum Value of Shrinkage Stress |
| | Layer | a | b | c | d | Polystyrene | Titanium dioxide | (° C.) | (times) | (%) | (%) | (MPa) |
| EXAMPLE 7 | A | 30 | 67 | 3 | 0 | 0 | 0 | 70 | 4.0 | 31 | 96 | 14 |
| | B | 10 | 65 | 5 | 0 | 10 | 10 | | | | | |
| | A | 30 | 67 | 3 | 0 | 0 | 0 | | | | | |
| EXAMPLE 8 | A | 30 | 65 | 5 | 0 | 0 | 0 | 69 | 4.0 | 30 | 96 | 13 |
| | B | 10 | 65 | 5 | 0 | 10 | 10 | | | | | |
| | A | 30 | 65 | 5 | 0 | 0 | 0 | | | | | |
| EXAMPLE 9 | A | 10 | 67 | 3 | 0 | 10 | 10 | 74 | 4.0 | 25 | 97 | 13 |
| | B | 10 | 67 | 3 | 0 | 10 | 10 | | | | | |
| | A | 10 | 67 | 3 | 0 | 10 | 10 | | | | | |
| COMPARATIVE EXAMPLE 2 | A | 30 | 67 | 3 | 0 | 0 | 0 | 74 | 4.0 | 85 | 9 | 15 |
| | B | 30 | 67 | 3 | 0 | 0 | 0 | | | | | |
| | A | 30 | 67 | 3 | 0 | 0 | 0 | | | | | |
| COMPARATIVE EXAMPLE 3 | A | 15 | 60 | 0 | 25 | 0 | 0 | 78 | 5.0 | 80 | 10 | 10 |
| | B | 15 | 60 | 0 | 25 | 0 | 0 | | | | | |
| | A | 15 | 60 | 0 | 25 | 0 | 0 | | | | | |

| | Layer | Heat shrinkage percentage (%) | | | | Film elongation at break (%) After 28 days | Solvent Adhesion Strength | Label Shrinkage Property |
|---|---|---|---|---|---|---|---|---|
| | | (1) | (2) | (3) | (4) | (5) | | |
| EXAMPLE 7 | A B A | 73.5 | 0.5 | 69.0 | 0 | 500 or more | 100 or more | ○ | ○ |

TABLE 2-continued

| | | | | | | | | | | |
|---|---|---|---|---|---|---|---|---|---|---|
| EXAMPLE 8 | A | 72.5 | 0.5 | 70.0 | 0 | 500 or more | 100 or more | | ○ | ○ |
| | B | | | | | | | | | |
| | A | | | | | | | | | |
| EXAMPLE 9 | A | 73.0 | 1.0 | 68.0 | 1.0 | 500 or more | 100 or more | | X | ○ |
| | B | | | | | | | | | |
| | A | | | | | | | | | |
| COMPARATIVE EXAMPLE 2 | A | 74.0 | 0.5 | 71.0 | 1.0 | 500 or more | 4 | | ○ | ○ |
| | B | | | | | | | | | |
| | A | | | | | | | | | |
| COMPARATIVE EXAMPLE 3 | A | 67.0 | 9.0 | 62.0 | 4.0 | 500 or more | 3 | | ○ | X |
| | B | | | | | | | | | |
| | A | | | | | | | | | |

(1) in direction perpendicular to maximum shrinkage direction in hot water at 95° C.
(2) in maximum shrinkage direction in hot water at 95° C.
(3) in direction perpendicular to maximum shrinkage direction in hot water at 80° C.
(4) in maximum shrinkage direction in hot water at 80° C.
(5) Immediately after production As is obvious from TABLE 2, the heat-shrinkable polyester films prepared in EXAMPLES 7 to 9 had an excellent heat shrinkage property suitable as a full label for use in packaging PET bottles, and an excellent light blocking property.

In contrast, the heat-shrinkable polyester film prepared in COMPARATIVE EXAMPLE 2 and 3 were inferior in the light blocking property. The heat-shrinkable polyester film prepared in COMPARATIVE EXAMPLE 2 and 3 were thus inferior both in film quality and practicality.

Example 10

As shown in TABLE 3, a polyester composition (a resin for A layer) consisting of 30 weight % of polyester a, 67 weight % of polyester b, and 3 weight % of polyester c, and another polyester composition (a resin for B layer) consisting of 10 weight % of polyester a, 67 weight % of polyester b, 3 weight % of polyester c, 10 weight % of crystalline polystyrene resin (G797N manufactured by Japan Polystyrene) and 10 weight % of titanium dioxide (TA-300 manufactured by Fuji Titanium Industry) were, respectively, supplied into and mixed and melted in two separate extruders and the resulting molten-polymers were fed into and layered in a feed block, and cast from a T die at 280° C. into a three-layered film at such a feed rate that the resulting cast film would provide a drawn film having a thickness ratio of A/B/A at 5/20/5 μm, and rapidly chilled by chill rolls, yielding an undrawn film.

The drawn film was then drawn 4.0 times at a film temperature of 70° C. in the traverse direction in a tenter, yielding a heat-shrinkable polyester film with a thickness of 30 μm.

Examples 11 and 12, and Comparative Examples 4 and 5

In a similar manner to EXAMPLE 10 except that the content of polyester, polystyrene, and titanium dioxide, and the drawing condition were changed, various heat-shrinkable polyester films having the composition shown in TABLE 3 with a thickness 30 μm were prepared.

The results of evaluation of the film samples prepared in EXAMPLES 10 to 12, and COMPARATIVE EXAMPLES 4 and 5 were summarized in TABLE 3.

TABLE 3

| | | Additives | | | | | Drawing condition | | Total Luminous Transmission (%) | Haze (%) | Maximum Value of Shrinkage Stress (MPa) | Heat shrinkage percentage (%) | | | | Label Shrinkage Property | Solvent Adhesion Strength |
|---|---|---|---|---|---|---|---|---|---|---|---|---|---|---|---|---|---|
| | Layer | Polyester | | | | Polystrene | Titanium dioxide | Drawing Temperature (° C.) | Drawing Ratio (times) | | | | (1) | (2) | (3) | (4) | | |
| | | a | b | c | d | | | | | | | | | | | | | |
| EXAMPLE 10 | A | 30 | 67 | 3 | 0 | 0 | 0 | 74 | 4 | 32 | 96 | 14 | 0.5 | 73.5 | 0 | 70 | ○ | ○ |
| | B | 10 | 67 | 3 | 0 | 10 | 10 | | | | | | | | | | | |
| | A | 30 | 67 | 3 | 0 | 0 | 0 | | | | | | | | | | | |
| EXAMPLE 11 | A | 30 | 65 | 5 | 0 | 0 | 0 | 69 | 4 | 34 | 95 | 13 | 1 | 73 | 0 | 69 | ○ | ○ |
| | B | 10 | 65 | 5 | 0 | 10 | 10 | | | | | | | | | | | |
| | A | 30 | 65 | 5 | 0 | 0 | 0 | | | | | | | | | | | |
| EXAMPLE 12 | A | 10 | 67 | 3 | 0 | 10 | 10 | 74 | 4 | 26 | 97 | 13 | 1.5 | 73 | 0.5 | 68 | ○ | X |
| | B | 10 | 67 | 3 | 0 | 10 | 10 | | | | | | | | | | | |
| | A | 10 | 67 | 3 | 0 | 10 | 10 | | | | | | | | | | | |
| COMPARATIVE EXAMPLE 4 | A | 30 | 65 | 5 | 0 | 0 | 0 | 74 | 4 | 85 | 8 | 15 | 0.5 | 74 | 0 | 71 | ○ | ○ |
| | B | 30 | 65 | 5 | 0 | 0 | 0 | | | | | | | | | | | |
| | A | 30 | 65 | 5 | 0 | 0 | 0 | | | | | | | | | | | |
| COMPARATIVE TIVE | A | 15 | 60 | 0 | 25 | 0 | 0 | 78 | 5 | 80 | 9 | 10 | 8 | 68 | 4 | 63 | X | ○ |
| | B | 15 | 60 | 0 | 25 | 0 | 0 | | | | | | | | | | | |

TABLE 3-continued

|  |  | Additives |  |  |  |  |  | Drawing condition |  | Total |  |  |  | Heat shrinkage percentage (%) |  |  |  | Label Shrink-age Prop-erty | Sol-vent Adhe-sion Strength |
|---|---|---|---|---|---|---|---|---|---|---|---|---|---|---|---|---|---|---|---|
|  |  | Polyester |  |  |  | Poly- | Tita-nium | Draw-ing Tempe-rature | Draw-ing Ratio | Lumi-nous Trans-mission | Haze | Maximum Value of Shrinkage Stress |  |  |  |  |  |  |  |
|  | Lay-er | a | b | c | d | strene | dioxide | (°C.) | (times) | (%) | (%) | (MPa) | (1) | (2) | (3) | (4) |  |  |  |
| EXAMPLE 5 | A | 15 | 60 | 0 | 25 | 0 | 0 |  |  |  |  |  |  |  |  |  |  |  |  |

(1) in direction perpendicular to maximum shrinkage direction in hot water at 95° C.
(2) in maximum shrinkage direction in hot water at 95° C.
(3) in direction perpendicular to maximum shrinkage direction in hot water at 80° C.
(4) in maximum shrinkage direction in hot water at 80° C.

As is obvious from TABLE 3, the heat-shrinkable polyester films prepared in EXAMPLES 10 to 12 had an excellent heat shrinkage property suitable as a full label for use in packaging PET bottles and an excellent light-blocking property.

In contrast, the heat-shrinkable polyester films prepared in COMPARATIVE EXAMPLE 4 and 5 were inferior in the light blocking property. Thus, the heat-shrinkable polyester films prepared in COMPARATIVE EXAMPLES 4 and 5 were inferior both in film quality and practicality.

The heat-shrinkable polyester films of the present invention are superior in film quality and practicality, and suitable as a heat-shrinkable label for packaging, especially for shrink-wrapping of a container containing a deteriorative content.

This application is based on patent application Nos. 2002-37314, 2002-115249 and 2002-280868 filed in Japan, the contents of which are hereby incorporated by references.

As this invention may be embodied in several forms without departing from the spirit of essential characteristics thereof., the present embodiment is therefore illustrative and not restrictive, since the scope of the invention, is defined by the appended claims rather than by the description preceding them, and all changes that fall within metes and bounds of the claims, or equivalence of such metes and bounds are therefore intended to embraced by the claims.

What is claimed is:

1. A heat-shrinkable multi-layered polyester film made of a polyester resin and comprising a three-layer A/B/A structure, wherein layer B is a void containing layer and layers A are layers having no voids, and
    wherein the film has a total luminous transmittance of not more than 40%, a haze of not less than 90%, a heat shrinkage percentage of not less than 50% in a maximum shrinkage direction and a heat shrinkage percentage of not more than 10% in a direction orthogonal to the maximum shrinkage direction as determined by cutting a square sample in a size of 10 cm×10 cm off from the film, immersing the square sample film in hot water at 95° C. for 10 seconds, subsequently in water at 25° C. for 10 seconds, and withdrawing the square sample film from the water, the film has a heat shrinkage percentage of 65% or more in the maximum shrinkage direction and a heat shrinkage percentage of not more than 2% in the direction orthogonal to the maximum shrinkage direction as determined by cutting a square sample in a size of 10 cm×10 cm off from the film, immersing the square sample film in hot water at 80° C. for 10 seconds, subsequently in water at 25° C. for 10 seconds, and withdrawing the square sample film from the water, and the A/B/A structure has a thickness ratio for the three layers in the range of 25/50/25 to 10/80/10,
    wherein the film has a solvent adhesion strength of not less than 4N/15 mm.

2. A heat-shrinkable multi-layered polyester film according to claim 1, wherein a maximum value of heat shrinkage stress in the maximum shrinkage direction at 90° C. is not more than 15 MPa, the heat shrinkage stress in the maximum shrinkage direction being determined on a testing device under test conditions of a temperature of 90° C., a hot air flow rate of 5 m/sec, a sample width of 20 mm and a distance between chucks on the testing device of 100 mm.

3. A heat-shrinkable multi-layered polyester film according to claim 1, having a film elongation at break in the direction orthogonal to the maximum shrinkage direction of 5% or more after the film is stored under an atmosphere of 30° C. and relative humidity 85% for 28 days.

4. A heat-shrinkable multi-layered polyester film according to claim 1, wherein the void-containing layer is made of a polyester resin containing inactive fine particles and a resin not miscible with the polyester resin.

5. A heat-shrinkable multi-layered polyester film according to claim 4, wherein the inactive fine particles are titanium oxide particles.

6. A heat-shrinkable multi-layered polyester film according to claim 4, wherein the resin not miscible with the polyester resin is a polystyrene resin.

7. A heat-shrinkable multi-layered polyester film according to claim 1, wherein the polyester resin is a polyester resin composition comprising a polyester resin and a polyester elastomer.

8. A heat-shrinkable multi-layered polyester film according to claim 7, wherein the polyester resin is 50 to 99 weight % of the polyester resin composition and the polyester elastomer is 1 to 50 weight % of the polyester composition.

9. A heat-shrinkable multi-layered polyester film according to claim 7, wherein the polyester elastomer is a polyester block copolymer consisting of a relatively high melting point crystalline polyester segment and a relatively low melting point soft segment.

10. A heat-shrinkable multi-layered polyester film according to claim 9, wherein the relatively low melting point soft segment is polylactone.

* * * * *